Aug. 26, 1958     E. E. HUPP     2,848,981
FLUID PRESSURE SERVO-MOTOR
Filed May 2, 1956
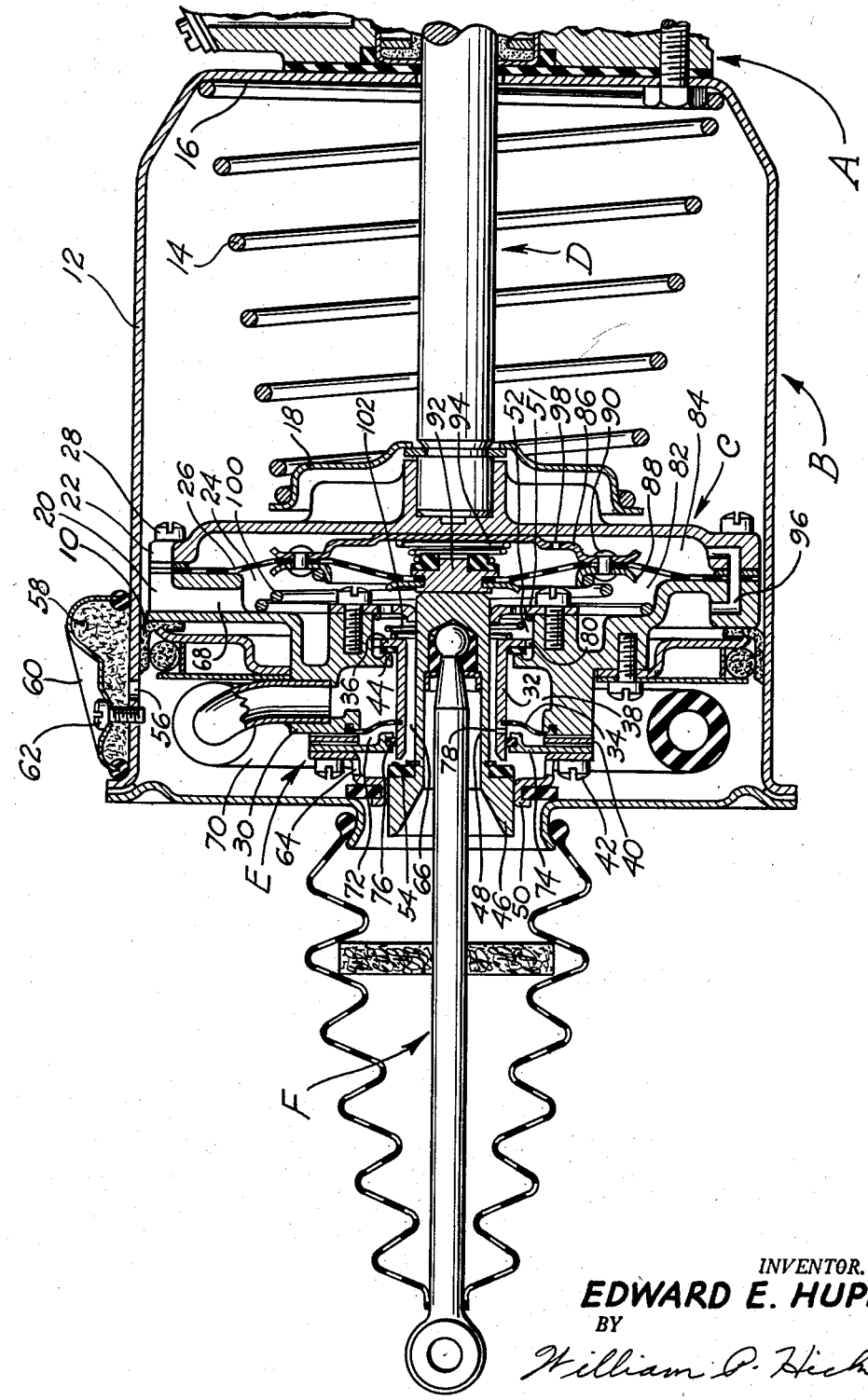
INVENTOR.
EDWARD E. HUPP.
BY
*William P. Hickey*
ATTORNEY

2,848,981

FLUID PRESSURE SERVO-MOTOR

Edward E. Hupp, South Bend, Ind., assignor to Bendix Aviation Corporation, South Bend, Ind., a corporation of Delaware Application May 2, 1956, Serial No. 582,273

4 Claims. (Cl. 121—46.5)

The present invention relates to valving generally, and more particularly to the type of valving adapted to be used in fluid pressure servo-motors and the like.

An object of the present invention is the provision of new and improved substantially balanced valving for servo-motors and the like which is inexpensive to manufacture, rugged in its construction and efficient in its operation.

A more particular object of the invention is the provision of a new and improved substantially balanced valve structure for servo-motors and the like in which a sleeve-like member having radially extending portions is utilized to provide a first annular pressure chamber; one of the radially extending portions being adapted to abut a radially inwardly extending valve seat on the side walls of an enclosing structure, and the other of said portions being constructed so as to provide a seal with respect to the surrounding structure and at the same time permit axial movement of the sleeve-like member. The valve structure further comprising a rigid partition member carried by the surrounding structure and slidably engaging the sleeve-like member and being positioned adjacent the latter mentioned of the radially extending portions of the sleeve-like member to form a valve balancing chamber.

The invention resides in certain constructions and combinations and arrangements of parts; and further objects and advantages will become apparent to those skilled in the art to which the invention relates from the following description of the preferred embodiment described with reference to the accompanying drawing forming a part of this specification, and in which the unitary figure of the drawing is a cross sectional view of a pneumatic fluid pressure servo-motor embodying principles of the present invention.

The unit shown in the drawing generally comprises a hydraulic master cylinder A (of well known construction and only a portion of which is shown) attached to one end of a vacuum powered fluid pressure servo-motor B containing an internal power piston C adapted to receive one end of the fluid displacement member D and force it into the master cylinder A. Operation of the unit is controlled by valve structure E mounted upon the piston C; and which valve structure is in turn actuated by the foot pedal lever (not shown) of the vehicle through push rod F.

The hydraulic master cylinder A is of well known construction and will not be further described. For more complete details of its construction and operation see the Earl R. Price et al. application Serial No. 513,514.

The vacuum powered fluid pressure servo-motor B is an atmospheric suspended unit in which atmospheric pressure normally exists on both sides of its power piston C, and actuation of the piston C is accomplished by admitting vacuum to its rearwardly positioned side. The outer edges of the piston C are provided with a pneumatic seal 10 slidably engaging the side walls 12 of the servo-motor, and the piston C is biased to its normal brake releasing forward position shown in the drawing by means of a coil spring 14 positioned between the rearward end 16 of the servo-motor and a spring abutment plate 18 suitably affixed to the fluid displacement member D.

Power piston C is formed in front and rear piston sections 20 and 22, respectively, to provide an internal piston or diaphragm chamber 24 containing a diaphragm 26—the outer edges of which are clamped between the sections 20 and 22 as by machine screws 28. The front section 20 of the piston C is provided with a forwardly extending annular boss 30 which houses the previously referred to control valve structure E.

The valve structure E comprises an annular sleeve-like member 32 positioned within the annular boss 30 and is provided with axially spaced radially outwardly extending portions 34 and 36 which engage the boss 30 to form an annular vacuum chamber 38. The forwardly positioned radially extending portion 34 is made from a flexible rubber material vulcanized onto the annular sleeve 32; and the radially outer edge of the sleeve portion 34 is sealingly clamped to the front face of the boss 30 by means of a retaining washer 40 and machine screws 42. The rearwardly positioned flange portion 36 is formed by a laterally turned portion of the sleeve 32 which is coated with a resilient material such as rubber to provide a seal with an annular valve seat 44 projecting radially inwardly from the side edges of the boss.

The valve structure E also comprises an axially movable generally cylindrically shaped control member 46 which extends through the sleeve 32 and which is suitably affixed to the push rod F for actuation thereby. The center portion 48 of the control member 46 is considerably smaller than the opening through the annular sleeve 32 to provide for the free passage of air therebetween, and the front and rear ends of the control member are guided for axial movement by the front and rear guide plates 50 and 51, respectively. Atmospheric pressure continually exists in the space surrounding the forward end of the sleeve-like member 32, as will presently be described; and the flow of air into the control chamber 52 of the valve is controlled by engagement of a shoulder 54 on the control member 46 with the forward end of the annular sleeve-like member 32.

Atmospheric pressure is continually fed to the front side of the piston C through opening 56 in the side wall 12. Filter material 58 is supported over the opening 56 by means of retaining plate 60 and machine screws 62 to prevent the entrance of dirt and water to the servo-motor. Shoulder 54 is normally maintained forwardly of the sleeve 32 to permit air from the front side of the piston C to flow through opening 64 in the front guide plate 50, annular space 66 of the control valve structure, internal diaphragm chamber 24 and piston passageway 68 to reach the rear side of the piston C, thereby establishing the normal atmospheric suspended condition of the servo-motor. Actuation of the servo-motor is produced by depressing the foot pedal lever of the automotive vehicle; whereupon shoulder 54 is forced into engagement with the annular sleeve 32 to close off atmospheric communication between opposite sides of the piston C. Vacuum is continually supplied to the annular vacuum chamber 38 from a point outside the servo-motor by means of flexible tube 70, and continued inward movement of the valve control member 46 causes annular sleeve 32 to move its rear flange portion 36 out of engagement with the vacuum valve seat 44. Vacuum is thereupon communicated with the rear side of the power piston C through the internal piston chamber 24 and piston passageway 68, and the piston C is caused to move rearwardly to displace fluid from the master cylinder A.

According to the principles of the present invention, a substantially rigid partition carried by the surrounding housing or boss 30 and slidably engaging the sleeve-like member 32 is provided adjacent the movable wall or diaphragm portion 34 to form a valve balancing chamber 72. In the preferred embodiment shown in the drawing, the partition member 74 is positioned forwardly of the diaphragm 34 and is formed by an annular plate clamped between the front guide plate 50 and the retaining washer 40 and is provided with a pneumatic seal 76 adapted to slidingly engage the sleeve-like member 32. Flow communication is established between the valve balancing chamber 72 and the valve's control chamber 52 (which in the present embodiment includes the annular space 66) by means of one or more openings 78 in the sleeve-like member 32 to provide the same pressure differential across the diaphragm 34 as exists across the rear flange 36. By proper proportioning of the diaphragm 34 and rear flange 36, equal and opposite forces will be exerted upon the sleeve-like member 32 under substantially all valve operating conditions to produce a substantially balanced valve structure. Were the partition member 74 not used, atmospheric pressure would be exerted against the diaphragm 34 to produce an unbalanced condition, which unbalanced condition would be intensified as the pressure in the control chamber decreased. Partition member 74 serves the additional purpose of centering and guiding the front end of the sleeve-like member 32, and projections 80 on the outer edge of the rear flange 36 slidingly engage the inner surfaces of the boss to center and guide the rear portion of the sleeve.

The servo-motor B is of a type adapted to provide "feel" or a reactive force opposing valve actuating movement to indicate to the operator the amount of force delivered by the unit. This is accomplished in the preferred embodiment by means of diaphragm 26 which divides the internal piston chamber 24 into forwardly and rearwardly opposed diaphragm chambers 82 and 84, respectively. The diaphragm 26 is designed to deliver its reactive force to the control member 46 in two stages. The first or initial stage of the diaphragm reaction is produced by engagement of its center portion with the valve control member 46, and is intended to simulate the forces normally required to bring the brake shoes of an automotive vehicle into engagement with their brake drums. The second or major stage of the diaphragm reaction is produced by the combined effect of the inner and outer portions of the diaphragm and is intended to provide a reaction generally proportional to the forces being delivered by the servo-motor. The diaphragm 26 is divided into its primary and secondary portions by means of a center plate 86 fastened to the back side of the diaphragm by means of an annular retaining ring 88 and through-rivets 90. The center portion of the diaphragm is provided with a centrally located button 92 biased into engagement with the valve control member 46 by means of a coil spring 94 interpositioned between the button and the center plate 86. Atmospheric pressure is continually communicated to the rear opposed diaphragm chamber 84 by piston passageway 96, and thence to the back side of the diaphragm's center portion by means of an opening 98 in the center plate 86.

Rearward movement of the valve control member 46 causes the rear flange portion 36 of the annular sleeve 32 to be moved out of engagement with its seat 44 thereby admitting vacuum to the front opposed diaphragm chamber 82 to produce a differential pressure across the diaphragm. A counter reaction spring 100 of predetermined strength biases the center plate 86 into engagement with the rear surface of the internal piston chamber 24 to initially hold the center plate 86 out of engagement with the button 92. During the initial stage of pressure differential build-up across the diaphragm, only forces exerted on the center or primary portion of the diaphragm are transmitted through the button 92 to the valve control member 46. When sufficient vacuum has been introduced to the front opposed diaphragm chamber 82 to overcome the effect of counter reaction spring 100, center plate 86 moves into engagement with the diaphragm button 92 to produce a combined effect of both portions of the diaphragm upon the control member.

Release of the vehicle brakes is accomplished by retraction of the foot pedal lever, whereupon coil spring 94 in conjunction with the forces across the diaphragm 26 move the control member 46 forwardly. Forward movement of the control member 46 permits coil spring 102 to move the rear flange portion 36 into engagement with the vacuum valve seat 44 thereby closing off further vacuum communication with the control valve chamber of the valve. Further retraction of the foot pedal lever permits the control valve member 46 to be moved out of engagement with the front end of the sleeve-like member 32 to admit air pressure through the control valve chamber and thence to the rear side of the power piston C. Pressure build-up on the rear side of the power piston permits the reaction of the fluid displacement member D in conjunction with coil spring 14 to move the piston C forwardly and thereby carry the sleeve 32 again into engagement with the control member 46. Abutment of the sleeve 32 with the control member closes off further flow of air to the rear side of the power piston C causing the piston to assume a position corresponding to that of the brake pedal of the automotive vehicle. Full retraction of the brake pedal lever, of course, permits the valve control member 46 to maintain a position forwardly of the sleeve-like member 32, and the servo-motor to again assume the normal brake releasing atmospheric suspended condition shown in the drawing.

From the foregoing description of the preferred embodiment of the invention it will be apparent that the objects heretofore enumerated as well as others have been accomplished. While the preferred embodiment has been shown and described in considerable detail, the invention is not limited to the particular construction shown and described; and it is my intention to cover hereby all adaptations, modifications, and uses thereof which come within the practice of those skilled in the art to which the invention relates.

I claim:

1. In a control valve for fluid pressure servo-motors and the like: a body member having an opening therein; a first valve seat in said opening adjacent one end of said opening; a sleeve-like member in said opening having a first generally rigid radially extending flange portion having a sealing surface thereon for abutment with said valve seat, and a second generally radially extending flange portion spaced toward the other end of said opening from said first valve seat, said second flange portion providing a movable wall in sealing engagement with the sidewalls of said opening to thereby form a first valve pressure chamber therewith; a rigid partition member spaced toward said other end of said opening from said second flange portion and slidably and sealingly engaging said sleeve-like member to form a valve balancing chamber; said sleeve-like member having a second valve seat for its central opening which faces in the same direction as said sealing surface of said first flange portion; a valve closure member for abutment with said second valve seat; and means communicating said valve balancing chamber with the space that communicates said first and second valve seats.

2. In a control valve for fluid pressure servo-motors and the like: a body member having an opening therein; a first valve seat in said opening adjacent one end of said opening; a sleeve-like member in said opening having a first generally rigid radially extending flange portion having a sealing surface for abutment with said valve seat, and a second generally radially extending flexible flange portion spaced toward the other end of said opening from said first valve seat, said second flange portion providing a movable wall in sealing engagement with the sidewalls of said opening to thereby form a first valve pressure chamber therewith, a rigid partition member spaced toward said other end of said opening from said second flange portion and slidably and sealingly engaging said sleeve-like member to form a valve balancing chamber; said sleeve-like member having a second valve seat for its central opening which faces in the same direction as said sealing surface of said first flange portion, said second valve seat being spaced toward said other end of said opening in said body member from said second flexible flange portion; a valve closure member for abutment with said second valve seat; and said sleeve-like member having an opening therethrough communicating said valve balancing chamber with its central opening between said first and second valve seats.

3. In a control valve for fluid pressure servo-motors and the like, a body member having an internal valve chamber, a sleeve-like member in said chamber having forwardly and rearwardly spaced radially extending portions forming a first annular pressure chamber with respect to the side walls of said valve chamber, a radially inwardly extending valve seat in said valve chamber spaced forwardly of and adapted to be abutted by said rearwardly positioned radially extending portions, said forwardly positioned radially extending portion sealingly engaging the side walls of said valve chamber, a valve closure member adapted to close off the opening through said sleeve-like member, a rigid partition member spaced forwardly of said forwardly spaced radially extending portion and slidably and sealingly engaging said sleeve-like member to provide a valve balancing chamber adjacent the forward side of said forwardly spaced radially extending portion, and means communicating the space between said valve closure member and said valve seat to said valve balancing chamber.

4. In a control valve for fluid pressure servo-motors and the like, a body member having an internal valve chamber, a sleeve-like member in said chamber having forwardly and rearwardly spaced radially extending portions forming a first annular pressure chamber with respect to the side walls of said valve chamber, a radially inwardly extending valve seat in said valve chamber spaced forwardly of and adapted to be abutted by said rearwardly positioned radially extending portions, said forwardly positioned radially extending portion being a diaphragm sealingly engaging the side walls of said valve chamber, a valve closure member adapted to close off the opening through said sleeve-like member, and a rigid partition member spaced forwardly of said diaphragm and slidably and sealingly engaging said sleeve-like member to provide a valve balancing chamber adjacent one side of said diaphragm and which balancing chamber is in fluid flow communication with the space adjacent the rearward side of said radially inwardly extending valve seat.

References Cited in the file of this patent

UNITED STATES PATENTS

| | | |
|---|---|---|
| 2,685,170 | Price | Aug. 3, 1954 |
| 2,690,740 | Hupp | Oct. 5, 1954 |
| 2,779,314 | Vorech | Jan. 29, 1957 |